Nov. 21, 1939.  K. C. D. HICKMAN  2,180,356
VACUUM DISTILLATION OF OILS CONTAINING VITAMINS
Filed Nov. 27, 1936
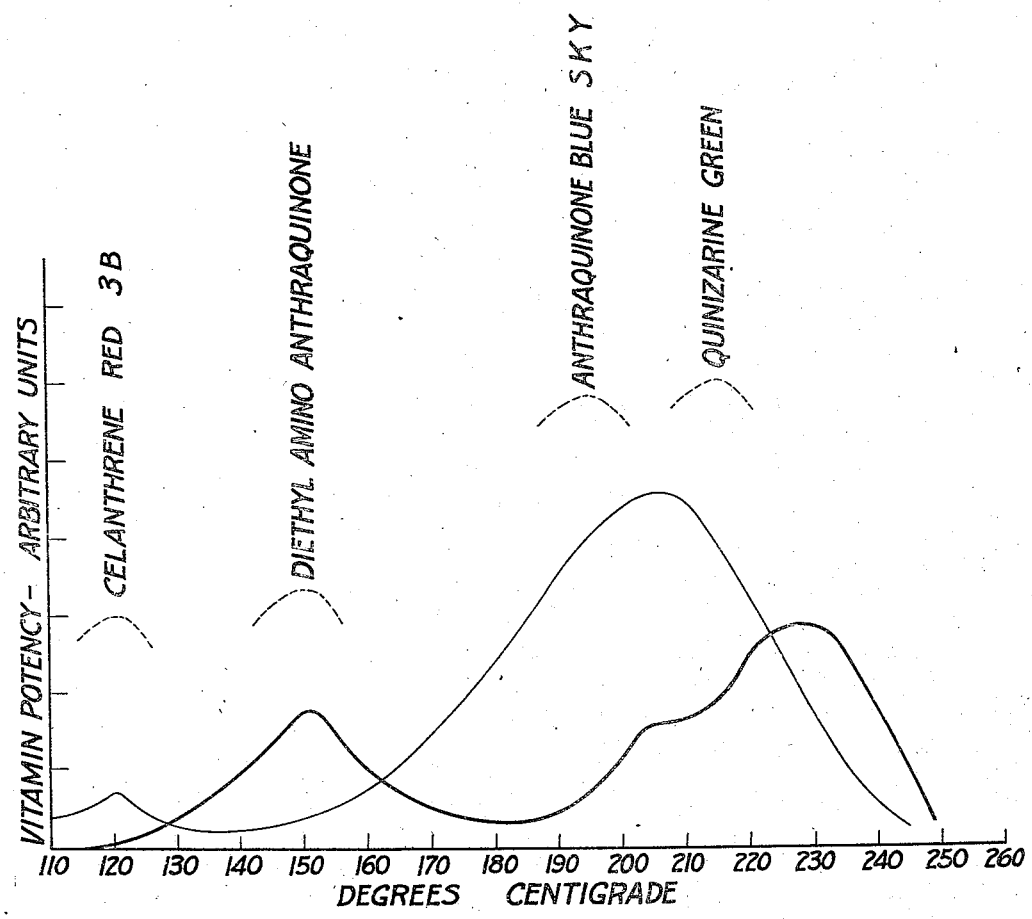
Kenneth C. D. Hickman
INVENTOR.
BY Newton M. Perrins
Warren N. Cannon
ATTORNEYS Patented Nov. 21, 1939

2,180,356

UNITED STATES PATENT OFFICE 2,180,356

VACUUM DISTILLATION OF OILS CONTAINING VITAMINS

Kenneth C. D. Hickman, Rochester, N. Y., assignor, by mesne assignments, to Distillation Products, Inc., Rochester, N. Y., a corporation of Delaware Application November 27, 1936, Serial No. 112,847

1 Claim. (Cl. 202—52)

This invention relates to improved methods of vitamin concentration and more particularly to improvements in the high vacuum distillation of mixtures containing fat soluble vitamins.

A type of short path-high vacuum distillation known as molecular distillation has been applied to the concentration of vitamins contained in natural oils such as fish oils. Processes of this nature are disclosed in British Patent #415,088, and in my U. S. Patent #1,925,559. The procedure disclosed involves heating the fish oil under molecular distillation conditions and removing a distillate containing vitamins.

This invention has for its object to provide an improved process for the molecular distillation of fish oils. Another object is to provide a short path-high vacuum distillation process whereby the fat soluble vitamin content of fish oils can be recovered in excellent yield. Another object is to provide a process of this nature by which the vitamins of fish oils can be separated into fractions of high potency and which are free of undesirable constituents. A further object is to provide a process of shortpath, high vacuum or molecular distillation by which fish oils can be processed to yield vitamin fractions containing substantially only a single vitamin or mixtures of vitamins A and D of predetermined high potency. Other objects will appear hereinafter.

In distilling mixtures containing vitamins A and D such as fish oils, I have found that the individual vitamins distil in maximum amounts at different temperatures or over different temperature ranges. By varying the temperature of distillation in a predetermined manner, fractions containing a preponderance of one vitamin can be recovered. In the same way fractions of high commercial potency containing substantially only a single vitamin or a mixture can be segregated. Vitamins A and D have been found to be present in natural fish oils in four different forms and by properly selecting the distillation conditions, these four forms can be segregated from the oil without substantial loss, and free of undesirable constituents such as fatty acids.

Marine animal oils contain vitamin A in two different forms, the alcohol form distilling in maximum amounts under molecular conditions at about 120° C., and the ester form at about 205° C. Vitamin D also occurs in two forms distilling under the same conditions in maximum amounts at about 150° and 225° C. Since these temperatures represent the point of maximum elimination rate, they can be used to segregate the four vitamin forms, however, since the elimination takes place at a relatively high rate over a broader temperature range, it is preferable to separate broader cuts or fractions.

In the accompanying drawing is shown a graph of the elimination curves of vitamins A and D from a fish oil during simple molecular distillation. By the expression simple distillation, I exclude the process of redistillation of the fractions, combination of certain of the sub-fractions, followed by further distillation and so on. While I consider such redistillation to be within the scope of my invention I find it convenient to express the boiling points (temperatures of maximum elimination) of the varieties of vitamins as measured during simple distillation only. Referring to the drawing, the potency of fractions in arbitrary units is plotted against temperature and the heavy curve represents vitamin D and the lighter curve vitamin A. It will be seen that both vitamins exhibit two maxima which represent different forms of each. In processing a fish oil it is desirable to collect fractions in the neighborhood of the points of maximum distillation since these fractions would be of high potency. Since the fractions containing the low boiling forms of vitamins A and D are contaminated with fatty acids and since the amounts of the low boiling vitamin A is small the collection of this fraction is not of great importance. The low boiling vitamin D is present in greater quantity and in usual commercial practice it would be desirable to recover the fractions in which it is contained. High boiling vitamin A is present in much larger quantities and for this reason its recovery by separation of one or more fractions between 180° and 230° C. is of great importance. Collection of fractions within this range will yield highly potent vitamin A concentrates which may also contain a valuable quantity of high boiling vitamin D, depending upon the manner in which the fractions are collected.

Whether the oil is to be distilled with a view to recovering only vitamin A or vitamin D or both it is necessary to degas the oil prior to distillation. Regardless of what the after treatment will be the oil is degassed until the internal pressure of gas dissolved in the oil is less than 500 microns and it is an advantage to degas until the internal pressure is less than 10 microns. If the oil is degassed to approximately 300 microns the distillation stages are preferably conducted in separate chambers so that the gas liberated in the first chambers will not pass into the later high temperature chambers. If, however, the degassing has been carried out to around 10 microns, the distillation stages may occur in series on one distillation column, each successive series or unit portion of the column being heated to a higher temperature, or the separate columns may be housed in the same vacuum chamber. Since the high boiling form of vitamin D (vitamin D ester) is not as thermally stable as high boiling vitamin A (vitamin A ester) it is desirable to process the oil as quickly as possible and, hence in as few stages as possible. It is a distinct advantage therefore to give the oil a very thorough degassing preferably to an internal pressure of less than about 5 microns. Convenient apparatus for degassing is a centrifugal degasser of the type disclosed in my application #99,631 filed September 5, 1936.

In order to separate the most useful vitamin A concentrate it is necessary first to remove free fatty acids which distill at from about 110° to 170°. This fraction can be separated as a whole containing both fatty acids and vitamins A and D in free form; after which the high boiling vitamins can be removed at the higher temperature. However, since the low boiling components are valuable it is desirable to conduct the distillation with a view to their recovery. With this in mind I prefer to employ 6 or more stages of distillation although the number of stages is not especially important. Operating in this manner the degassed oil is passed into a six stage still in which fractions are drawn off at each stage with the distilland heated to the following temperatures:

| Stage | Temperature ° C. |
|---|---|
| 1 | 120±20 |
| 2 | 160 {+10 / −20} |
| 3 | 180±15 |
| 4 | 215±15 |
| 5 | 230±15 |
| 6 | 235−260 |

In stages 1 and 2 practically the whole of the free fatty acid is eliminated. The fraction in stage 1 also contains the small amount of vitamin A alcohol and that in stage 2 most of the low boiling or free form of vitamin D and some cholesterol. The balance of the cholesterol and the free vitamin D and some vitamin A ester is obtained in fraction 3. The fourth fraction is exceedingly rich in vitamin A esters and depending upon the particular temperature selected may contain substantial amounts of high boiling D. The fifth fraction contains the high boiling forms of both vitamins A and D, but in less concentration. Fraction 6 consists of light colored, odorless bland glycerides substantially free from vitamins and sterols, and entirely free from free fatty acids.

Fractions 2 and 3 are preferably chilled and filtered to remove cholesterol which may be further purified, by crystallization from ethyl or methyl alcohol. The filtrate from stage 2 and the distillate from stage one can then be combined as a source of fatty acids. They can however, be collected and treated to recover their vitamin content by neutralization and if desired, followed by extraction and/or distillation. Filtered fraction 3 containing some vitamin A ester can be further distilled such as for instance by adding it to the incoming oil or it may be used as a concentrate of low potency depending upon its vitamin content. Re-distillation is preferred since in this way the small content of free fatty acids is given an opportunity for coming out in the first and second stages and the vitamin A ester given an opportunity to come out in the fourth and fifth fractions. The fourth fraction has a vitamin A potency of 15,000 to 150,000 international units per gram depending on the oil treated. A good grade of cod liver oil will yield a fourth fraction having about 100,000 units. A super grade of cod liver oil containing 3,000 units will yield a fraction having 150,000 units per gram. A pure grade of salmon oil containing 1,000 units of vitamin A should yield a fourth fraction of 50,000 units per gram. A crude menhaden oil containing only 300 units of vitamin A per gram will yield a fourth distillate of 15,000 or more units per gram. Needless to say this fraction of very high potency, which is free of fatty acids and other undesirable constituents, is in a condition for use after dilution to appropriate potency. The vitamins in this fraction are probably in the best condition as yet known to science for assimilation by the human or animal organism. The naturally occurring vitamin esters have been preserved by the distillation process, but the odor, free acids, and large bulk of diluent oil, all of which prove troublesome to a sensitive stomach, have been removed. The fifth fraction contains vitamin A ester in more dilute form. It is valuable as a cattle or poultry feed and for other industrial uses. The concentration can be increased by redistillation. If it is desired to obtain all the available vitamin A in the fourth fraction the fifth fraction may be added to the incoming oil.

The sixth fraction is pale yellow to white in color and is substantially free from odor and contains no protein or mineral solids. It is convenient if the distilling column for this sixth stage is larger than the other columns, since it is desirable to distil 50 to 80% of the oil. If desired seventh and eighth stages may be added so that the distillation of the main body of the oil may be conducted in steps. This enables the more unsaturated glycerides of high boiling point to be collected separately. If desired the sixth etc. stage may be eliminated and the oil, after extraction of vitamins in the first five stages, may be withdrawn from the still and used directly for industrial purposes. This residue oil is darker in color than the incoming oil. Thus, a medicinal grade cod liver oil which is palest lemon yellow before distillation becomes the palest brown residue after distillation. The residues, however, are free from sterols and aromatic substances and are substantially odorless and tasteless. Any protein matter present has been coagulated by heat and is readily filtered from the oil. The oil may be decolorized by treatment with absorbent materials such as activated charcoal, fuller's earth or silica gel.

The above procedure is preferred when processing to recover vitamin A. When processing to recover both vitamins A and D the procedure is substantially the same, but some modifications are introduced. Vitamin A esters distil in greatest quantity at 205° or about 10° below the temperature at which quinizarine green would distil in greatest quantity if added to the oil as a distillation indicator. High boiling vitamin D distills in greatest quantity at about 225° C. or about 10° above that at which quinizarine green would distil. The vitamin A esters survive 90% unharmed by the heat of distillation if the passage through the distilling columns from the lowest to the highest temperature does not take more than 20 minutes. However, the high boiling D survives in like degree only if the passage through the distilling columns from the lowest to the highest temperature takes place in less than one minute. Approximately one half of the high boiling D survives if the distillation treatment at 180°–260° C. takes place in two minutes. The recovery of vitamin D is best if the passage from 180° C. to 240° C. is complete in less than ten seconds. The low boiling form of vitamin D is likewise much less stable than vitamin A esters, but its decomposition is less, due to the fact that it distils at a much lower temperature. In order to enable the use of these desirable short heating periods the total length of the columns over which the oil flows in the temperature ranges between 180°–240° should be less than 100 inches and preferably about 30 inches or less. The distillation stages in this temperature range may be kept separate from one another, but in this case the oil should be rapidly transferred from one column to another, or partially cooled during the passage between them, in order to diminish the total time that the oil is held at the highest temperatures. Preferably the distillation stages are done on one hot column which is heated to increasing temperature throughout its length in the direction in which the oil passes over it. A suitable construction of this type is disclosed in my co-pending application referred to above. If the above conditions are observed the second and especially the fourth and fifth fractions will be much increased in vitamin D potency. Although vitamin D can be extracted profitably from any oil containing 50 or more units per gram, the vitamin is extracted most usefully from oils containing more than 100 units per gram and less than .3 percent free fatty acids.

The following is an example of the method of processing a good grade of cod liver oil containing .2% free fatty acids, 150 U. S. P. X units per gram of vitamin D and 1500 U. S. P. X units per gram of vitamin A

| Fraction | Temperature of distilland | Character |
|---|---|---|
| | °C. | |
| 1 | 120 | Free fatty acids, small amounts of free vitamins A and D. |
| 2 | 170 | 50 percent fatty acids, 49 percent glycerides, cholesterol 600 U. S. P. X free vitamin D. |
| 3 | 185 | 5–12 percent fatty acids, 2,000–3,000 U. S. P. X free vitamin D, 20,000 U. S. P. X vitamin A esters per gram. |
| 4 | 215 | 1,500–2,500 U. S. P. X high boiling vitamin D; 50,000 to 70,000 U. S. P. X vitamin A ester; 3 percent cholesterol. |
| 5 | 235 | 500–1,500 U. S. P. X high boiling vitamin D; 20,000 U. S. P. X units vitamin A ester; 1 percent cholesterol. |
| 6 | 240 | Bland oil. |

Fraction 1 is employed as a source of free fatty acids. The same may be done with fraction 2 or it may be either filtered, distilled or saponified and extracted to recover its vitamin and cholesterol content. Fraction 3 which is rich in free vitamin D and low in vitamin A may be treated in various ways. It is necessary first to neutralize the free fatty acids. This may be done by adding caustic alkali in quantity slightly in excess of the fatty acid. The treated oil is then washed with water until substantially free of soap and dried by vacuum or with dehydrating agents. This may be used as a commercial concentrate or the vitamin content further concentrated by redistillation. One redistillation segregates 80% of the vitamin D into a second fraction containing 8,000 to 10,000 U. S. P. X units per gram. An alternative method of treatment involves complete saponification. The non-saponifiable portion contains 30,000 to 50,000 U. S. P. X units of vitamin D per gram together with the vitamin A alcohol. The vitamin A can be separated by redistillation as described above if desired.

Fraction four contains both vitamins, the vitamin A being in very high concentration. It is excellently suited for most pharmaceutical uses after dilution to standard potency. Where a highly potent vitamin A concentrate free of vitamin D is desired, the vitamins can be segregated by saponifying and distilling the nonsaponifiable portion.

Fraction five contains high boiling vitamin D in relatively greater amount than vitamin A ester, compared with the vitamin ratio in the original oil. It also contains glycerides which distil at nearly the same temperature. Redistillation to further concentrate this fraction is possible, but is not very effective. When it is not of sufficient potency it is better to resort to partial or complete saponification, followed if desired by redistillation.

While I have disclosed my invention by examples of preferred procedure under commercial operation, it is not intended that it be limited to the specific examples given. The number of fractions collected is not critical and it may for instance be desirable to remove the first and second or even the third fraction all as a single fraction. This procedure would remove all of the fatty acids etc. and enable the collection of fractions in the high potency range between about 180° and 240° C. The mode of procedure disclosed in this particular range is preferred, but other satisfactory methods can be used. For instance a broad single cut in this entire range could be taken or a cut from 190°–235° would remove the bulk of the highly potent materials distilling within this range as illustrated in the accompanying drawing.

All of the distilling operations are carried out under molecular distillation conditions or under conditions which closely approach them. Molecular distillation is well known in the art and the conditions and mode of operation are described in numerous publications such as for instance the patents above referred to; U. S. Patents 1,955,321 and 1,942,858 and Bur. Standards Journ. Res. vol. 2 (1929) page 476. Molecular distillation in general involves using such a low pressure (below .1 mm. and usually below .01 mm. such as about .005–.0001 mm.) that distilling vapors have an appreciable mean free path and condensing the distilling vapors at a distance of less than the mean free path.

It will be appreciated that commercial fish oils differ in composition according to the season and location of the fisheries. While free forms of the vitamins have constant and exactly reproducible distillation temperatures, because they are single substances, the high boiling vitamins are mixtures of esters which differ from one batch of oil to another. The maxima for the esters are therefore broader than for the free vitamins and their positions vary on the temperature axis. However, the maxima do not vary greatly and will closely approximate those disclosed, so that the preferred temperature range for collection of fractions will be substantially the same. The relative relation of the elimination curves and peaks remains the same, the only difference being that the whole set off curves will move as a unit a few degrees up or down on the temperature scale. In order to positively identify the exact temperature of maximum elimination, indicators may be added which have a maximum distilling point having a known relation to that of one vitamin or all if desired. This manner of operation is disclosed in my co-pending application 67,332 filed March 6, 1936. The temperature of distillation of each vitamin component can thus be clearly observed. It has been found that the following indicators distil at a point having the indicated relation to the maximum distilling points of the various vitamins. This relation is also clearly shown in the graph in which the dotted lines represent the elimination curves of the indicators.

| Vitamin | Indicator | Temperature relationship |
|---|---|---|
| A alcohol | Celanthrene Red 3B | Same temperature. |
| D free form | Di ethyl amine anthraquinone. | Do. |
| A esters | Anthraquinone Blue S. K. Y. | Indicator distils 10° below. |
| A esters | Quinizarine green | Indicator distils 10° above. |
| High boiling D | do | Indicator distils 10° below. |

These relations can be taken as the point of maximum distillation of each vitamin and by reference to the graph the temperature ranges for each fraction given, can be transposed into a corresponding indicator range. For instance to transpose the fraction 180°–240° it is noted on the graph that the indicator anthraquinone Blue S. K. Y. distils at 195° C. Therefore the point 180° is 15° below that of distillation temperature of this indicator. Quinizarine green distils at 215° so that 240° would be 25° above the maximum distillation point of quinizarine green. The same 180°–240° fraction would be removed therefore if we added these two indicators to the oil and removed a fraction coming over from 15° below that of anthraquinone Blue S. K. Y. to 15° above that of quinizarine green. This forms a convenient method of identifying fractions which will be constant regardless of variations in distilling conditions and composition. The use of indicators in redistilling combined fractions is of decided advantage. When indicators are to be used it may be desirable to carry out a pilot distillation using indicators and then distil the bulk of the oil at the temperatures indicated by the pilot experiment. This method is disclosed in my co-pending application No. 112,139 filed November 21, 1936.

It is desirable to treat an oil as low in free fatty acid content as possible. Alkali refining or neutralization is expensive and time consuming procedure and in many cases it will be more desirable from a commercial standpoint to distil the untreated oil or select an oil low in acid content. If the oil is naturally low in acid content or due to neutralization, it will be found that the first fractions will contain much less free fatty acids and this will greatly simplify their treatment for recovery of vitamin content. The oil should preferably contain less than 5% free fatty acids and the process is considerably simplified if it contains less than about .3%.

Due to the relative instability of vitamin D, processing with a view to its recovery is best performed in a still in which the oil is caused to flow through the still in a thin film by forces greater than gravity. This method of operation is disclosed in my co-pending application #99,632 filed September 5, 1936. The temperature conditions disclosed above would be satisfactory in such a still, but would not be preferred since such stills enable the use of higher temperatures due to the very high rate of vaporization. The conditions therefore give optimum results when used in connection with the well known type of short path or molecular still in which the oil is caused to flow over the distilling column by gravitational force.

Since solids such as cholesterol collect on the condensing walls in the first stages, they tend to clog the apparatus, necessitating interruption of the process and otherwise impairing the efficiency of the distillation. It is therefore desirable to flow a low vapor pressure solvent over the condensing surface to remove distillate, during the distillation. A preferred solvent is chilled filtered distillate from which solids have been removed. This expedient has been described in greater detail in the copending application of Hickman and Hecker #61,790 filed January 31, 1936.

This application is a continuation in part of applications #39,148 filed September 4, 1935; #44,631 filed October 11, 1935; #46,957 filed October 26, 1935; #64,178 filed February 15, 1936; #67,332 filed March 5, 1936 and #75,163 filed April 18, 1936.

What I claim is:

In the process of molecular distillation of fish oils to obtain concentrated fat soluble vitamins the steps which comprise segregating components distilling up to 170° C., separating a fraction at between about 170° and 195° C. and returning it to the fresh incoming oil to be distilled, and separating a fraction high in vitamin content at a temperature between about 195° and 230° C.

KENNETH C. D. HICKMAN.